United States Patent [19]

Naruse et al.

[11] Patent Number: 5,786,093
[45] Date of Patent: Jul. 28, 1998

[54] MAGNETIC RECORDING MEDIUM HAVING A BACKCOAT COMPOSITION WITH LOW CHLORIDE ION AND SULFATE ION EXTRACTABLES

[75] Inventors: Hiroji Naruse; Taketoshi Sato; Taro Ohmura, all of Miyagi, Japan

[73] Assignee: Sony Corporation, Tokyo, Japan

[21] Appl. No.: 748,542

[22] Filed: Nov. 13, 1996

[30] Foreign Application Priority Data

Nov. 15, 1995 [JP] Japan .................. 7-296959
Dec. 22, 1995 [JP] Japan .................. 7-335386

[51] Int. Cl.⁶ .................................................. G11B 5/70
[52] U.S. Cl. .................. 428/425.9; 428/694 BB; 428/900
[58] Field of Search .................. 428/425.9, 694 BB, 428/900

[56] References Cited

U.S. PATENT DOCUMENTS

| | | | |
|---|---|---|---|
| 4,604,296 | 8/1986 | Aonuma et al. | 427/57 |
| 4,629,646 | 12/1986 | Ide et al. | 428/143 |
| 4,801,500 | 1/1989 | Yasunaga et al. | 428/336 |
| 5,008,147 | 4/1991 | Ryoke et al. | 428/323 |
| 5,089,331 | 2/1992 | Ryoke et al. | 428/323 |

*Primary Examiner*—Stevan A. Resan
*Attorney, Agent, or Firm*—Hill & Simpson

[57] ABSTRACT

A magnetic recording medium wherein a magnetic metal film has been formed on one surface of a non-magnetic substrate, and a back coat resulting from a non-magnetic pigment dispersed among a binder has been formed on the other, or reverse to the side upon which the magnetic film has been formed, characterized by that each of the chloride and sulfate ion contents of the back coat, according to the analysis by ion chromatography of its pure water extract, is not more than 5 ppm, and that the binder acting as a constituent of the back coat contains at least polycarbonate urethane.

2 Claims, 1 Drawing Sheet

MAGNETIC RECORDING MEDIUM HAVING A BACKCOAT COMPOSITION WITH LOW CHLORIDE ION AND SULFATE ION EXTRACTABLES

BACKGROUND OF THE INVENTION

1. Field of the Invention

The present invention relates to a so-called metal depositing type of magnetic recording medium which is produced by applying a ferromagnetic metal film onto a non-magnetic substrate by a film forming means such as vacuum deposition or sputtering, and particularly to the formation of an improved back coat thereof.

2. Prior Art

Conventional magnetic recording media can be classified into two types according to their production methods: the so-called coating type is produced after a magnetic material composed of a ferromagnetic powder, a binder and an organic solvent has been applied onto a non-magnetic substrate, and the so-called metal depositing type is produced after a magnetic metal has been directly deposited under vacuum onto a non-magnetic substrate by a film forming means such as vacuum deposition or sputtering.

A magnetic recording medium belonging to the metal depositing type is superior in its magnetic properties such as coercive force and saturated flux density to the counterpart of the coating type, and allows an excellent magneto-electric conversion in densely recorded areas. Therefore, it has been put to use as a magnetic recording medium for videotape recorders such as high-band 8 mm videotape recorders, digital videotape recorders (VTRs) and others, and expects further applications for more sophisticated systems.

A magnetic recording medium of the metal depositing type has a magnetic surface as smooth as a mirror, and thus when it is wound, the effective friction coefficient the magnetic surface forms against the non-magnetic substrate with which it comes into direct contact tends to rise. To compensate for such a difference in friction coefficients, a back coat is formed on the other side (reverse to the side upon which the magnetic film has been coated) of the non-magnetic substrate. The surface roughness of the back coat has been adjusted to an appropriate value. Such back coat is indispensable because it controls the surface roughness of the back coat of the non-magnetic substrate, inhibits deposition of electric charges thereupon, eliminates untoward effects from dusts and stabilizes the traveling of the recording medium in question.

Usually the back coat is formed by dispersing while mixing a non-magnetic pigment such as carbon having an appropriate particle size together with a binder and an organic solvent to produce a back coat material, and by coating the material onto one side of a non-magnetic substrate.

Recently, recording/reproducing systems have been made compact. Along with the compactness of cassette systems, their recording parts are also contracted, which necessitates further thinning of magnetic tapes used therefor. In general, the thickness of its non-magnetic substrate is reduced to thin a tape, which often leads to the weakening of the mechanical strength of the tape itself. To meet such inconvenience, conventional materials used for the non-magnetic substrate have been exchanged for new stronger materials.

As a tape is made thin, the proportion of a back coat to the whole thickness of the tape gets larger, which necessitates, in turn, the thinning of the back coat. This encourages the development of new techniques by which to produce thinner back coats. If such a technique could successfully be put to use, it would contribute to further compactness of recording/reproducing systems and to further elongation of recording hours, while restraining the impairment of the mechanical strength of the tapes and being able to tapes make thinner.

DETAILED DESCRIPTION OF THE INVENTION

Figure 1:
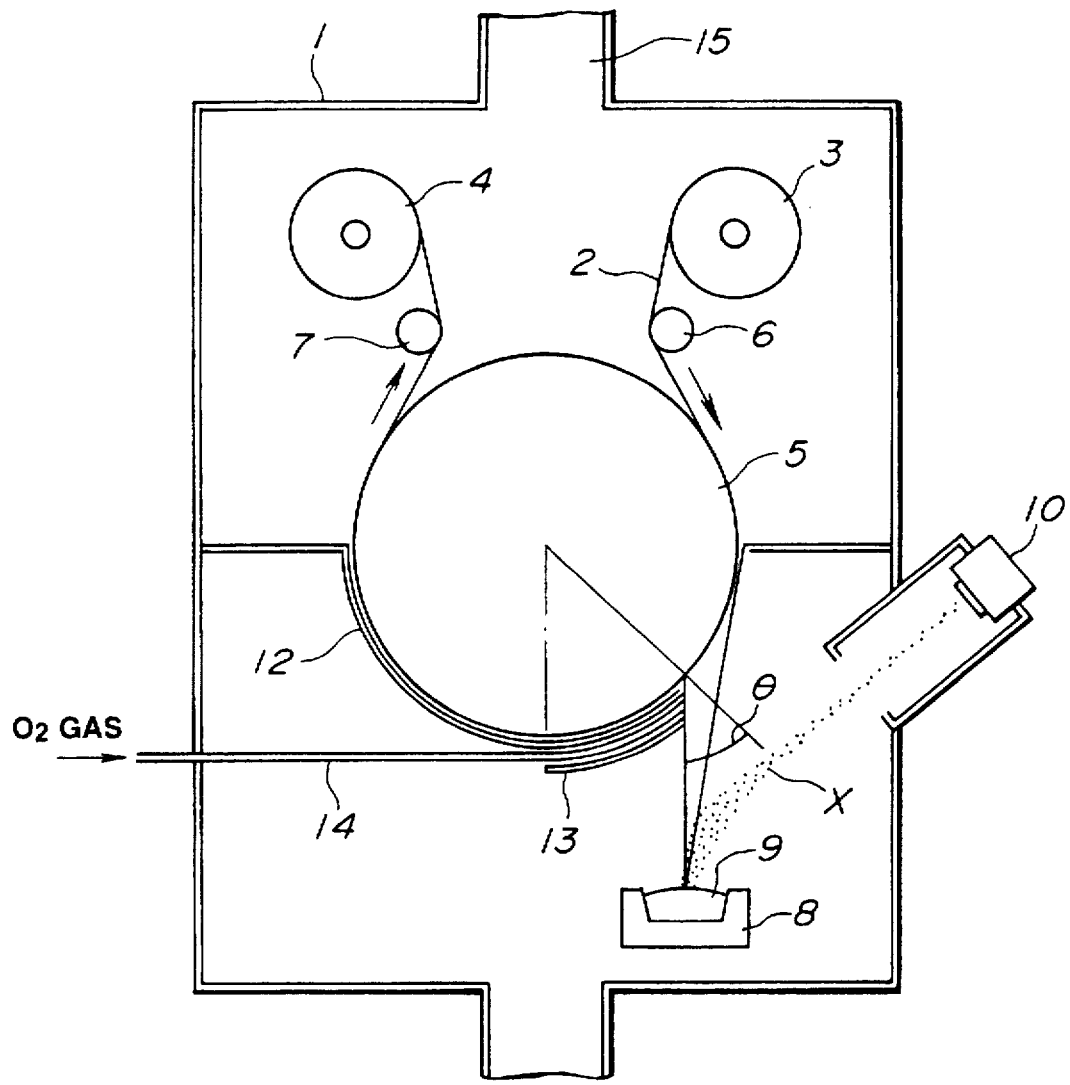
FIG. 1 is a schematic diagram illustrating a vacuum deposition system to prepare a magnetic metal film.

When a back coat is formed from a material of a conventional composition, pigment particles like carbon often come off therefrom. Thus, with such material, it has been difficult to maintain the reliability of the product.

Further, along with the compactness tendency of recording systems, organic materials such as polyacetal resins come to be used instead of conventional metals, as a material for the guide pins of VTRs to serve as a guide for the smooth traveling of the tape.

A back coat made from a material of a conventional composition has in some cases such a high friction against a guide made of an organic material as to impair the smooth traveling of the tape. Thus, with such material, it has been difficult to maintain the reliability of the product.

The present invention was proposed as a remedy for such problems often encountered with conventional materials, and aims at providing a magnetic recording medium stable in traveling, durable in use and suitable for high-density recording, based on a study of the composition of the materials used for the formation of a back coat.

The presence of a back coat is quite meritorious in that it improves the traveling performance of the medium. However, as we have inquired further into the problem from different angles, we found that some back coat impair the quality of the product: the magnetic properties of the magnetic metal film are deteriorated, drop-out cases are increased, and the traveling performance is impaired. Obviously, when back coat is formed, it is necessary to pay close attention to their negative effects.

To be more explicit, when a deposited tape with a back coat has been stored in a hot, humid condition for a long time, it undergoes far severer deterioration in its performance than a tape which has had no back coat formed thereupon. This is probably due to the fact that, when a tape with a back coat is wound into a coil, the back coat in direct contact with the magnetic film would exert some unknown harmful effects onto the magnetic film through the contact.

Digital VTRs or the like handling digital video signals require a very dense magnetic recording, for which the recording track pitch should be contracted to as short as 10 microns. Accordingly, even very small flaws escaping detection by conventional tests may have a grave effect on recording/reproduction in such high quality systems. Thus, it has been necessary to revise the back coat so as to eliminate it of such adverse influences.

The present invention was proposed as a remedy for such problems often encountered with conventional products, and aims at providing a magnetic recording medium which ensures good recording/reproducing performance in densely recorded areas, while keeping the magnetic properties of the magnetic metal film from deteriorating, drop-out cases from rising, and the traveling durability from being impaired.

To achieve above intention, the inventors have tried hard and found that, when a magnetic recording medium is produced after a magnetic film composed of a ferromagnetic metal or its alloy has been formed onto one side of a non-magnetic substrate, and a back coat has been formed on the other, or reverse to the side upon which the magnetic film has been formed, a magnetic recording medium particularly stable during storage which is improved in durability and traveling stability, and can be stored under a hot, humid condition for a long time, can be obtained when proper restrictions are imposed on the materials used for the formation of the back coat.

Further, they found that, when proper restrictions are imposed on the materials used for the formation of the back coat of said magnetic recording medium, it is possible to obtain a magnetic recording medium suitable for handling digital video signals, which has a good magneto-electric conversion and a reduced error rate.

The magnetic recording medium of this invention which is produced after a magnetic film composed of a ferromagnetic metal or its alloy has been formed onto one side of a non-magnetic substrate and a back coat has been formed on the other, or reverse to the side upon which the magnetic film has been formed, is characterized in that it includes a binder composed at least of polycarbonate polyurethane as an element of the back coat.

The product of this invention is characterized by having a polyisocyanate setting agent supplemented as a binder.

The magnetic recording medium of this invention is provided with a magnetic film which results from a ferromagnetic metal or its alloy coated onto a non-magnetic substrate.

A ferromagnetic metal material is directly deposited onto a non-magnetic substrate to form a magnetic film thereupon, and the magnetic metal material used for this purpose may include any metals applicable to conventional deposited tapes. For example, they may include ferromagnetic metals such as Fe, Co, Ni, etc., and ferromagnetic alloys such as Fe-Co, Co-Ni, Fe-Co-Ni, Fe-Cu, Co-Cu, Co-Au, Co-Pt, Mn-Bi, Mn-Al, Fe-Cr, Co-Cr, Ni-Cr, Fe-Co-Cr, Co-Ni-Cr, Fe- Co-Ni-Cr, etc. They may be used as a monolayer film or as a multi-layer film. Further, a basement layer or an intermediate layer may be inserted between the non-magnetic substrate and the magnetic metal film or, if the magnetic film is multi-layered, between individual layers, to improve adhesion between adjacent layers or to control repellent magnetic forces between them. Further, the outer region of the magnetic film may be composed of an oxide to improve the anti- corrosion resistance thereof.

To produce magnetic metal films, the so-called PVD technique may be used such as vacuum deposition whereby a ferromagnetic material is vaporized under vacuum by heating, to be deposited onto a non-magnetic substrate, ion-plating whereby a ferromagnetic material vaporizes as a result of electric discharge, and sputtering whereby glow discharges are allowed to occur in an atmosphere mainly composed of argon, and the resulting argon ions are used to eject atoms from the surface of a target object by collision.

Further, the magnetic metal material coated on said non-magnetic substrate may have a protective membrane thereupon. The material of such protective membrane can be prepared from any materials conventionally used for the protection of magnetic metal films. It may include, for example, carbon, $CrO_2$, $Al_2O_3$, BN, Co oxides, MgO, $SiO_2$, $Si_3O_4$, SiNx, SiC, SiNx, $ZrO_2$, $TiO_2$, TiC, etc. It may be used as a monolayer film or as a multi-layer film.

It is needless to say that the proper compositions of the magnetic tape of this invention are not limited to what has been described above, and any changes such as addition of a basement film to the non-magnetic substrate as appropriate, or addition of a film composed of a lubricant or an anti-corrosion agent can be introduced as long as they remain within the scope of this invention. The non-magnetic pigment, lubricant and anti-corrosion agent to be added to the material of a back coat may include any appropriate additives publicly known. The non-magnetic pigment may include, for example, in addition to carbon, as appropriate, hematite, mica, silica gel, magnesium oxide, zinc sulfate, tungsten carbide, boron nitride, starch, zinc oxide, kaolin, talc, clay, lead sulfate, barium carbonate, calcium carbonate, magnesium carbonate, boehmite ($\gamma$-$Al_2O_3$.$H_2O$), alumina, tungsten sulfide, titanium oxide, polytetrafluoroethylene powders, polyethylene powders, metal powders, etc.

The binder may include any binders publicly known, for example, vinyl chloride-vinyl acetate copolymers, vinyl chloride-vinyl acetate-vinyl alcohol copolymers, vinyl chloride-vinyl acetate-maleic acid copolymers, vinyl chloride-vinylidene chloride copolymers, vinyl chloride-acrylonitrile copolymers, acrylate ester-acrylonitrile copolymers, acrylate estervinylidene chloride copolymers, methacrylate ester-stylene copolymers, thermoplastic polyurethane resins, phenoxy resins, polyvinyl fluoride, vinylidenechloride-acrylonitrile copolymers, butadiene-acrylonitrile copolymers, butadiene-acrylonitrile-methacrylate copolymers, polyvinyl butyral, cellulose derivatives, stylene-butadiene copolymers, polyester resins, phenol resins, epoxy resins, thermosetting polyurethane resins, urea resins, melamine resins, alkyd resins, urea-formaldehyde resins or their mixtures.

Particularly, the material used for the formation of a back coat should contain at least polycarbonate polyurethane.

It should preferably contain further a polyisocyanate-based setting agent to improve the durability of the product, or an appropriate polar group.

The applicable solvent may include ketone solvents such as acetone, methylethyl ketone, methylisobutyl ketone, cyclohexane, etc., ester solvents such as methyl acetate, ethyl acetate, butyl acetate, ethyl lactate, glycolmonoethyl-ester acetate, etc., glycol ester solvents such as glycoldim-ethyl ether, glycolmonoethyl ether, dioxane, etc., or aromatic hydrocarbon solvents such as benzene, toluene, xylene, etc.

With regard to the present invention wherein the material used for the formation of a back coat contains a binder composed at least of polycarbonate urethane, it is possible to prevent a pigment such as carbon from peeling, thereby improving its durability and traveling stability.

Thus, the present invention can provide a high-density magnetic recording medium stable even when stored in a hot, humid condition, and excellent in traveling durability. The inventors had studied hard, and found that chloride and sulfate ions contained in a back coat are responsible for the deterioration of magnetic properties of a magnetic metal film and for the increase of drop-outs which occur as a result of the formation of the back coat, and that restriction of those ions within certain limits may prevent such deterioration of magnetic properties.

The present invention has been achieved on the basis of such discovery. More precisely, this invention provides a magnetic recording medium wherein a magnetic metal film has been formed on one surface of a non-magnetic substrate, and a back coat which results from dispersing a non-magnetic pigment among a binder has been formed on the other, or reverse to the side upon which the magnetic metal film has been formed, and wherein each of the chloride and sulfate ion contents of said back coat is 5 ppm or less according to the measurement by ion chromatography on a pure water extract of the back coat.

When the amounts of chloride ions and sulfate ions contained in the back coat are restricted within such limits, deterioration of the magnetic properties of the magnetic metal film, increase in drop-out cases, and impairment of traveling durability caused by the presence of a back coat can be prevented, and the resulting product can be stored even in a hot, humid condition, and ensures good recording/ reproducing performance.

DESCRIPTION OF THE PREFERRED EMBODIMENTS

The present invention will be detailed below with reference to examples, but the scope of this invention should not be limited to those examples.

EXAMPLE 1

Firstly, referring to the composition cited below, carbon particles with an overall chlorine content of 500 ppm are mixed together with polycarbonate or a binder, 2,4-tolylenediisocyanate (TDI or Coronate L-50 TM) or a cross-bridging agent, and an organic solvent to produce a material for back coat. The material for back coat has the following composition: the solid element is 15%, P/B ratio (the ratio of the added amount of the non-magnetic pigment against that of the binder) is 1.2 and the added amount of the cross-bridging agent is 10 weight parts with respect to 100 weight parts of the binder. The material for back coat was measured of its contents of chloride ions and of sulfate ions by applying its pure water extract to ion chromatography. The back coat composition was dried and ground to a powder. Five grams of the ground powder was put in 100 mls pure water and kept at 100° C. for about three hours in order to extract ion impurities including chloride ion and sulfate ion. Chloride ion and sulfate ion concentration was determined in a 50 ml sample of the extract water by measuring by ion chromatography. It was found to contain 5.00 ppm of chloride ions and 4.7 ppm of sulfate ions. The overall chlorine content of the carbon particles was measured as follows: the carbon was burnt in an argon/oxygen atmosphere, and the evolved hydrochloride was weighed by potentiometric titration.

Composition of the material for back coat Non-magnetic pigment: carbon particles 100 weight parts Binder: polycarbonate polyurethane resin 100 weight parts Setting agent: Colonate L50 10 weight parts Then, this blend for back coat was applied onto a polyethylene terephthalate film of 6 μm in thickness to form a coat of 0.5 μm in thickness, that is, a back coat.

Next, onto the side reverse to the side upon which the nonmagnetic back coat had been formed, a magnetic metal film having a composition of Co 80% - Ni 20% (the numeral represents the content of the element expressed as weight percent) was deposited in an oxygen atmosphere by inclined deposition such that it had a thickness of 200 nm. A vacuum deposition system used for this purpose is shown in FIG. 1.

This vacuum deposition system, as shown in FIG. 1, has a constitution wherein: into a vacuum chamber 1 of which air has been evacuated from outlets 15 prepared on the top and bottom thereof, placed are a feeding roll 3 which rotates at a constant speed counterclockwise when seen as depicted in the figure, and a winding roll 4 which rotates at a constant speed counterclockwise when seen as depicted in the figure, and a non-magnetic substrate 2 in the form of a tape is wound around the two rolls such that it travels continuously from the feeding roll 3 to the winding roll 4.

In the middle of the path along which said non-magnetic substrate 2 travels from the feeding roll 3 to the winding roll 4, placed is a cooling can 5 having a diameter larger than those of said rolls 3 and 4. This cooling can 5 is so constructed as to carry said non-magnetic substrate 2 downward in the figure and can rotate at a constant speed clockwise when seen as depicted in the figure. Each of said feeding roll 3, winding roll 4 and cooling can 5 have a form of cylinder whose height is nearly the same as the width of the non-magnetic substrate 2. Further, said cooling can 5 has a cooling device in its interior and not depicted here whereby said non-magnetic substrate 2 can be prevented from being deformed due to elevated temperatures there.

Above constitution of the system allows said non-magnetic substrate 2 to be carried continuously from the feeding roll 3, to pass round the circumference of said cooling can 5, and to be wound round the winding roll 4. Between said feeding roll 3 and said cooling can 5, and between the cooling can 5 and said winding roll 4, guide rolls 6 and 7 are placed respectively. They are to impose a predetermined tension onto the non-magneticsubstrate 2 which travels from said feeding roll 3 to the cooling can 5 and then from the cooling can 5 to the winding roll 4, thereby ensuring a smooth traveling of the non-magnetic substrate 2. In said vacuum chamber placed is a crucible 8 below said cooling can 5, which is filled with a magnetic metal 9. This crucible 8 has a width nearly the same as that of said cooling can 5 in the direction of height.

To a side wall of said vacuum chamber 1, mounted is an electronic gun 10 which serves for vaporizing by heating the magnetic metal 9 filled in said crucible 8. This electronic gun 10 is so mounted onto the side wall that an electron beam X emitted therefrom may be focused upon the magnetic metal 9 in said crucible 8. Further, the elements here concerned are so constructed that the magnetic metal 9 evaporated through bombardment of the beam from the electronic gun 10 is deposited onto the surface of the non-magnetic substrate 2 traveling at a constant speed round the circumference of said cooling can 5, thereby forming a magnetic film thereupon. Between said cooling can 5 and said crucible 8 and close to the cooling can 5 placed is a shutter 13. This shutter 13 is so placed that it may cover a predetermined area of the non-magnetic substrate 2 which travels at a constant speed round the circumference of said cooling can 5, and that said evaporated magnetic metal 9 may be deposited onto said non- magnetic substrate 2 obliquely with a predetermined minimum incidence angle of θ. During this deposition process, through an oxygen gas guide pipe 14 which penetrates a side wall of said vacuum chamber 1, oxygen gas is supplied onto the surface of the non-magnetic substrate 2. This improves magnetic properties, durability and weatherability of the product.

The conditions under which deposition was performed for the present examples will be given below.

Conditions for deposition Ingot: Co 80% Ni 20% (the numeral represents the content of the component element expressed as weight percent)

Incidence angle: 45°–90°

Oxygen supply: $3.3 \times 10^{-6}$ m$^3$/sec

Degree of vacuum: $7 \times 10^{-2}$ Pa

By the method described above, a magnetic metal film was formed, and onto this magnetic metal film coated is perfluoropolyether as a lubricant to form a top coat, and the resultant product was cut into a tape having a width of 8 mm.

EXAMPLES 2-4 AND COMPARATIVE EXAMPLES 1-2

Magnetic tapes were produced in the same manner as in Example 1 except that carbon particles as indicated in Table 1 were used as a material of the back coat.

The magnetic tapes produced as described above were stored in an atmosphere of 60° in temperature and 95% in relative humidity for 10 days, and then they were measured of the still durability, reduction in residual magnetic flux, and drop-outs. The results are shown in Table 1 together with the amounts of chloride ion and sulfate ion contained in the back coat.

The still durability was measured with an 8 mm VTR (Sony) under a multi-mode at a normal temperature.

Reduction in residual magnetic flux $\Delta\phi r$ was calculated according to the following equation.

Reduction in residual magnetic flux $\Delta\phi r = [(\text{residual magnetic flux before storage}) - (\text{residual magnetic flux after storage})]/(\text{residual magnetic flux before storage}) \times 100(\%)$
Drop-outs (-62B, 0.5 μsec) were counted by the use of a system ( EVS-900, Sony).

TABLE 1

| | Total chlorine content in carbon | Chloride ion content in back coat (ppm) | Sulfate ion content in back coat (ppm) | After storage at 65° C. and 95 RH % | | |
|---|---|---|---|---|---|---|
| | | | | Still time (minute) | $\Delta\phi r$ (%) | Drop-out (counts/min) |
| Example 1 | 500 | 5.0 | 4.7 | 50 | 14 | 920 |
| Example 2 | 230 | 1.5 | 3.1 | 67 | 6 | 310 |
| Example 3 | 350 | 3.0 | 2.2 | 45 | 8 | 250 |
| Example 4 | 180 | 0.6 | 3.3 | 79 | 7 | 520 |
| Comparative Example 1 | 1300 | 22.4 | 22.5 | 2 | 43 | >10000 |
| Comparative Example 2 | 960 | 15.9 | 20.4 | 15 | 30 | 8000 |

As is seen from Table 1, performance of a tape after having been stored in a hot, humid condition varies widely according to the amounts of chloride and sulfate ions contained in its back coat. Thus, the tapes of Examples 1 to 4 whose back coat contains 5 ppm or less of chloride and sulfate ions maintain a sufficient still durability, suffer less reduction in residual magnetic flux, and produce fewer drop-outs even after having been stored in a hot, humid condition.

By contrast, with regard to the tapes of Comparative Examples 1 and 2 whose back coat contains more than 5 ppm of chloride and sulfate ions, their still durability decreases greatly, residual magnetic flux drops greatly, and drop-outs become frequent after having been stored in a hot, humid condition.

From this, restricting the amounts of chloride and sulfate ions contained in the back coat is found effective for improving storage stability of the magnetic tape.

Next, a comparative study will be described where a polycarbonate-polyurethane copolymer and a polyurethane resin were used as a material for the back coat.

EXAMPLE 5

A magnetic tape prepared in the same manner as described in Example 1 was placed in an atmosphere of 25° C. in temperature and 50% in relative humidity, and the error rate and the still friction coefficient against POM were counted and measured.

EXAMPLE 6

A magnetic tape prepared in the same manner as described in Example 1 was placed in an atmosphere of 25° C. in temperature and 50% in relative humidity and allowed to record digital video signals. It was then allowed to stand in an atmosphere of 45° C. in temperature and 90% in relative humidity for 24 hours. After it being transferred to room temperature, the error rate and the still friction coefficient against POM were counted and measured.

EXAMPLE 7

A magnetic tape was prepared in the same manner as described in Example 1 except that the amount of a setting agent was changed to 5 weight parts.

COMPARATIVE EXAMPLE 3

A magnetic tape was prepared in the same manner as described in Example 5 except that the binder was changed to a polyurethane resin.

COMPARATIVE EXAMPLE 4

A magnetic tape was prepared in the same manner as described in Example 6 except that the binder was changed to a polyurethane resin.

EXPERIMENTAL RESULTS

A magnetic tape or a magnetic recording medium of this example was placed in an atmosphere of 25° C. in temperature and 50% in relative humidity and allowed to record digital video signals. It was then allowed to stand in an atmosphere of 45° C. in temperature and 90% in relative humidity for 24 hours. After being placed in an atmosphere at room temperature, the error rate and the still friction coefficient against POM were counted and measured. The results are shown in Table 2.

Friction was measured as follows: the back coat side was placed around a guide of 5 mm wide made of polyacetal resin (polyoxymethylene, POM) such that the arch formed by the contacting back coat had an angle of 90°, and was submitted to friction measurement to give a friction coefficient. The measurements are listed under the column "Still friction coefficient against POM."

A test magnetic tape was set into a system (consumer digital VTR, DCR-VX1000, Sony) and used for recording/reproducing video signals, and during this operation errors were counted to give an error rate. The back coat side of a test magnetic tape was placed around a guide made of polyacetal resin (polyoxymethylene, POM) and have a diameter of 5 mm such that the arch formed by the contacting back coat had an angle of 90°, and its friction was measured to give a still friction coefficient.

Magnetic tapes of Examples wherein polycarbonate polyurethane binders of the compositions as described in the table had been added, were allowed to record signals in the same manner as described in Comparative Example 4 and, after having been left in an atmosphere of 45° C. in temperature and 90% in relative humidity, were submitted to the measurement. They had a total thickness of not more than 7.5 μm.

TABLE 2

| | Binder | P/B *1 | Concentration of setting against PHR | 45° C. 24 hours | Friction coefficient against PDM | Error rate ×10$^{-5}$ |
|---|---|---|---|---|---|---|
| Comparative Example 5 | Polycarbonate/ Polyurethane copolymer | 1.0 | 10 | Not done | 0.45 | 4.5 |
| Comparative Example 6 | Polycarbonate/ Polyurethane copolymer | 1.0 | 10 | Done | 0.47 | 6.2 |
| Comparative Example 7 | Polycarbonate/ Polyurethane copolymer | 1.0 | 5 | Done | 0.46 | 5.2 |
| Comparative Example 3 | Polyurethane | 1.0 | 10 | Not done | 0.70 | 13 |
| Comparative Example 4 | Polyurethane | 1.0 | 10 | Done | 0.69 | 89 |

*1 P/B = weight ratio of carbon powder against binder

As is obvious from Table 2, Comparative Examples 3 and 4 whose binders were composed of polyurethane have higher error rates. Particularly, with regard to Comparative Example 3 which had been stored in a hot, humid condition for a long time, part of pigment and part of binder not yet cross-bridged which are contained in back coat peeled off and adhered to the magnetic film, thereby causing a significant rise in error rate.

Further, Comparative Examples 3 and 4 have higher friction coefficients against the guide pin made of an organic material represented by polyoxyethylene (POM), which may account for edge damages often arising as a result of tape traveling.

By contrast, with regard to Examples 5 to 7, even after they had been stored in a hot, humid condition for a long time, the pigment and binder were prevented from peeling off, and thus the error rates remained low.

Further, with regard to Examples 5 to 7, still friction coefficients against the guide pin made of polyoxyethylene (POM) could be restricted to low levels.

With regard to a back coat which, if otherwise constituted, would peel, when the binder is supplemented with polycarbonate urethane as in these Examples, the resulting back coat is deprived of the risk of its constituent pigment and cross-bridging agent coming off from its surface.

Accordingly, the magnetic recording medium of this invention or a magnetic recording medium comprising a magnetic metal film of 7.5 μm or less is characterized in that the material for the back coat contains a binder composed at least of polycarbonate polyurethane, and that the durability and traveling stability of the back coat is improved thereby.

As is obvious from above descriptions, with regard to the magnetic recording medium of this invention, the amounts of chloride ions and sulfate ions contained in the back coat is restricted to 5 ppm or less, which makes it possible to suppress deterioration of magnetic properties of the magnetic film caused by the presence of the back coat, increasing of drop-outs, and impairment of traveling durability. Accordingly, even if it has been stored in a hot, humid condition, it can still maintain excellent recording/reproducing performance in high-dense recording areas.

Further, with regard to the magnetic recording medium of this invention, the material used for the formation of the back coat contains a binder composed at least of polycarbonate polyurethane, which results in improvement of the durability, and of the traveling stability of the back coat traveling against a guide made of polyoxyethylene (POM). The present invention further provides a high-density magnetic recording medium excellent in stability even when stored in a hot, humid condition, and in traveling durability.

Particularly, when the magnetic recording medium according to this invention is applied for recording digital video signals, it ensures high reliability, and suppresses error rates to a low level.

What is claimed is:

1. A magnetic thin film recording medium comprising:
   a non-magnetic thin film substrate having first and second opposed major surfaces;
   a magnetic metal film disposed on the first major surface; and
   a back coating film disposed on the second major surface, said back coating film comprising a polycarbonate-polyurethane resin binder, a non-magnetic pigment powder and from about 5 to about 10 parts by weight based on 100 parts by weight of said resin binder of a polyisocyanate cross-linking agent, the weight ratio of non-magnetic pigment powder to resin binder being about 1:1 and said back coating film having a chloride ion and sulfate ion content such that, when a sample of said back coating film is dried and ground to a powder, and 5 grams of said powder is extracted with 100 mls of pure water at 100° C. for about 3 hours, and 50 mls of the extract water is subjected to ion chromatography, the extract water contains not more than 5 ppm of chloride ions and sulfate ions, respectively.

2. A magnetic thin film recording medium as defined in claim 1, wherein said magnetic metal film is disposed on the first surface by chemical vapor deposition.

* * * * *